(12) United States Patent
Albert et al.

(10) Patent No.: US 6,729,450 B1
(45) Date of Patent: May 4, 2004

(54) ELECTRO-HYDRAULIC BRAKE BOOSTER

(75) Inventors: Timothy J. Albert, Niles, MI (US);
William J. Penninger, Niles, MI (US);
Richard B McClain, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 11 days.

(21) Appl. No.: 10/307,835

(22) Filed: Dec. 2, 2002

(51) Int. Cl.$^7$ .................................................. B60T 11/00
(52) U.S. Cl. ................. 188/359; 303/113.4; 303/114.1; 60/534; 60/545
(58) Field of Search .................................... 188/358, 359; 303/114.1, 113.4, 155, DIG. 2; 60/562, 564, 566, 545, 534

(56) References Cited

U.S. PATENT DOCUMENTS

| | | | | |
|---|---|---|---|---|
| 3,976,171 | A | * 8/1976 | Belart | 188/345 |
| 4,179,980 | A | * 12/1979 | Kito et al. | 91/6 |
| 4,225,022 | A | * 9/1980 | Belart | 188/348 |
| 4,244,185 | A | * 1/1981 | Belart | 60/550 |
| 4,703,978 | A | * 11/1987 | Belart et al. | 303/52 |
| 4,730,877 | A | * 3/1988 | Seibert et al. | 303/52 |
| 5,168,966 | A | * 12/1992 | Thioux et al. | 188/346 |
| 6,226,993 | B1 | * 5/2001 | Heibel | 60/547.3 |
| 6,367,254 | B1 | * 4/2002 | Takasaki et al. | 60/548 |
| 6,431,662 | B2 | * 8/2002 | Isono et al. | 303/114.3 |

* cited by examiner

*Primary Examiner*—Jack Lavinder
*Assistant Examiner*—Benjamin A Pezzlo
(74) *Attorney, Agent, or Firm*—Leo H McCormick, Jr.; Warren Comstock

(57) ABSTRACT

A brake booster amplifies driver brake pedal input into an output force and travel for operating a master cylinder. A power unit builds and stores high pressure fluid to provide boost. Inlet and outlet solenoid valves regulate pressurized fluid to the amplifying mechanism. In one embodiment, a single boost chamber provides fluid pressure to operate the master cylinder and to provide a brake pressure indicative opposing force to driver input. One travel sensor monitors the position and movement of an input rod and piston, and a second travel sensor monitors the position and movement of an output piston. An ECU monitors system parameters and controls a motor pump, inlet and outlet valves and peripherals. In another embodiment, the opposing force to the brake pedal input is provided by a separate pressure fluid chamber located within and movable with the output piston. Boost chamber pressure and, optionally, output piston travel are monitored to provide a braking force indication. An ECU monitors system parameters including input travel and boost chamber pressure, and controls the inlet and outlet valves and peripherals.

20 Claims, 2 Drawing Sheets

ELECTRO-HYDRAULIC BRAKE BOOSTER

This invention relates to vehicular braking systems having a power assist feature therefor and more particularly to an electrohydraulic brake booster system. The system may have a common boost and input chamber or a separate input chamber within the boost piston.

BACKGROUND OF THE INVENTION

Early power assisted braking systems were vacuum actuated utilizing the engine intake manifold as a source of power. More recently, hydraulic assist systems have become popular. The hydraulic systems usually either rely on a power steering pump as a source of pressurized fluid or include a separate dedicated fluid pump. The hydraulic systems typically include a power assist unit or booster having a driver input piston disposed within an input cylinder and a power output piston disposed in a separate output cylinder for powering a master brake cylinder. Typically, the pressure on the working face of the input piston is monitored and the pressure applied to the working face of the output piston set accordingly. The distances traveled by the input and output pistons are largely ignored.

Brake booster systems are sometimes commanded to apply the maximum available fluid pressure for braking. Any additional brake pedal pressure fails to raise the force applied to the master cylinder. If no precautions are taken, the driver may continue to depress the brake pedal, but feel no increase in resistance to pedal motion. Finally, vehicle braking should still be possible despite catastrophic failure of the boost fluid pressure as by engine stoppage, or a belt slipping or breaking. Desirably, the system reverts to a conventional (no boost) braking mode.

SUMMARY OF THE INVENTION

It is desirable to take into account the travel of the input piston in setting output piston face pressure. Moreover, also monitoring the output piston travel allows the output pressure to be in part determined by that travel allowing variations in the ratio of input to output piston travel to be incorporated in the braking system.

The present invention provides solutions to the above concerns by providing a boost pressure system which may include linear measures of both driver input and boost output travel, may utilize a single boost chamber to supply both force to a vehicle master cylinder and opposition force to the driver input, or may employ a separate driver input force opposition from a pressure chamber enclosed within a boost piston.

The invention comprises, in one form thereof, a vehicle brake booster having a source of pressure fluid, a booster housing with first and second generally cylindrical bores therein, a driver actuable brake input piston reciprocally disposed in the first cylindrical bore, and a hydraulically powered brake master cylinder actuating output piston reciprocally disposed in the second cylindrical bore. The second cylindrical bore together with the output piston define a boost chamber with the input piston extending from the second bore into the boost chamber. A pressure fluid conduit couples the source of pressure fluid to the boost chamber, and the boost chamber is completely defined by the second cylindrical bore, the input piston, the output piston and the fluid conduit.

In another form, the invention includes a vehicle brake booster having a housing with a generally cylindrical bore and a hydraulically powered brake master cylinder actuating boost piston reciprocally disposed in the cylindrical bore. The cylindrical bore and a working face of the boost piston define a boost chamber. There is a generally cylindrical bore in the boost piston extending from the piston working face part way through the piston. A driver actuable brake input piston passes through the boost chamber and is reciprocally disposed within the boost piston bore. The boost piston bore and a working face of the input piston define an input chamber. There is a source of pressure fluid and an arrangement for selectively supplying fluid pressure from the source to the boost chamber and to the input chamber.

The invention also comprises a method of amplifying a hydraulic brake force applied by a vehicle operator in which the driver input brake force is sensed by monitoring linear motion of a driver actuable input piston. The amplified hydraulic braking force is sensed by monitoring linear motion of an output piston or pressure. Fluid from a fluid pressure source is conveyed to a boost chamber to move the output piston a distance proportional to the distance moved by the input piston to actuate a vehicle brake master cylinder in proportion to the sensed travel associated with the driver applied input brake force. The ratio of input piston travel to output piston travel may be modified.

An advantage of the present invention is that the ratio of input piston travel to that of output piston travel may be selectively modified as desired to facilitate driver pedal feel.

Another advantage of the present invention is that the system is fail-safe reverting to a completely manual mode in the event of hydraulic or electrical failure of the boost system.

BRIEF DESCRIPTION OF THE DRAWINGS

Corresponding reference characters indicate corresponding parts throughout the several views.

DETAILED DESCRIPTION OF THE INVENTION

Figure 1:
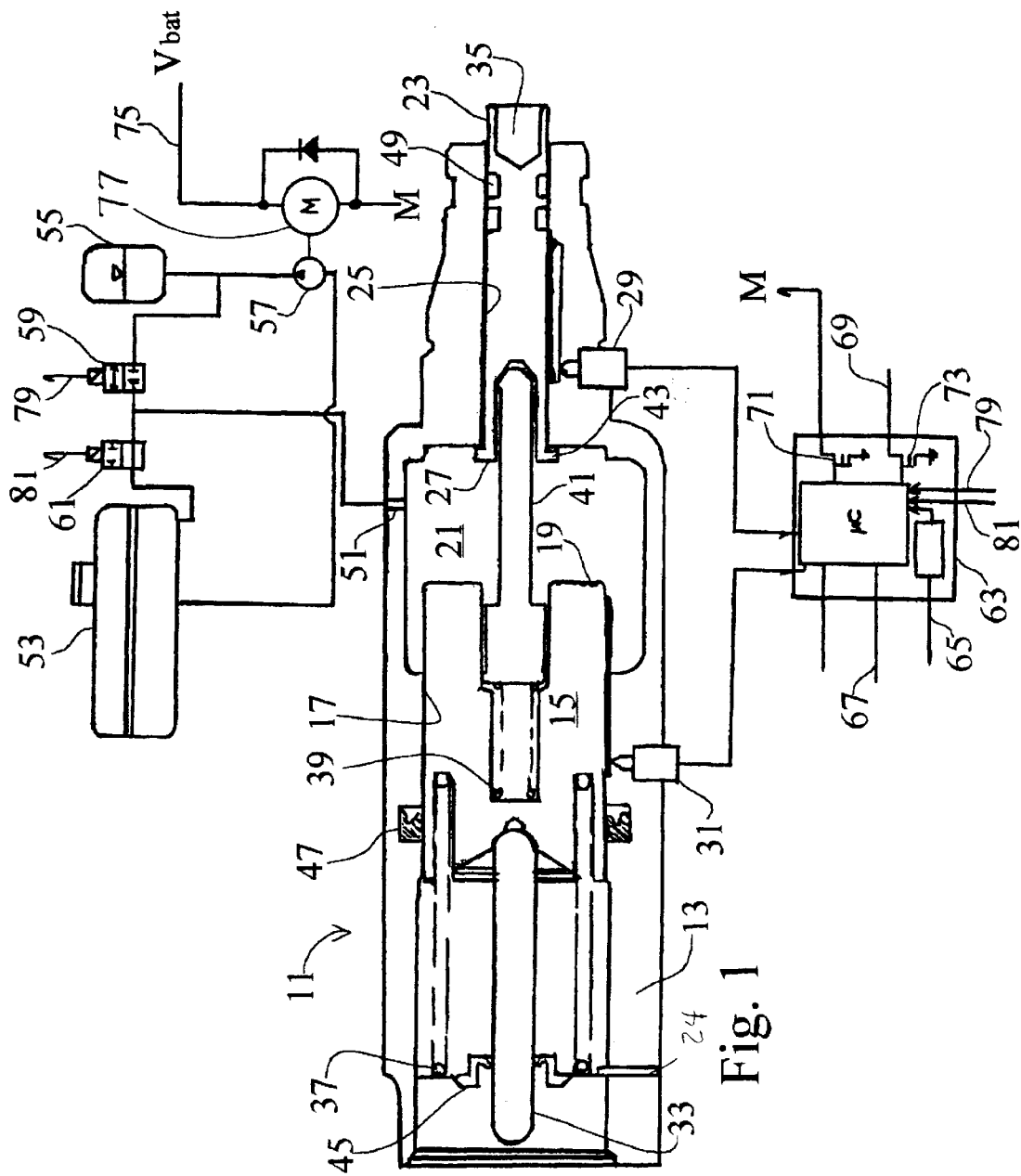
FIG. 1 is a partially cross-sectional, partially schematic view of a brake booster system according to a first embodiment of the invention.

Referring now to the drawings and particularly to FIG. 1, there is shown a hydraulic brake booster 11 in cross-section with associated hydraulic and electrical circuitry shown in block schematic form. The booster includes a housing 13 with a power output piston 15 reciprocally mounted within a generally cylindrical bore 17 within the housing. The output piston is mechanically coupled to a conventional vehicle braking system master cylinder (not shown) by output rod 33. One piston face 19 is exposed to hydraulic fluid pressure within a boost chamber 21 within the housing. The force of hydraulic pressure in chamber 21 acting on boost piston face 19 is opposed by a coil biasing spring 37 retained in housing 13 by spider 45. A driver actuable pedal input piston 23 is also reciprocally mounted within the housing 13 in a second generally cylindrical bore 25. The input piston is mechanically coupled to a conventional driver actuable vehicle brake pedal (not shown) by way of socket 35. The input piston 23 has a piston face 27 exposed to hydraulic fluid pressure within the boost chamber 21. The force of hydraulic pressure in chamber 21 acting on input piston face 27 is supplemented or reinforced by a return spring 39 that is coupled thereto by way of connecting rod 41. The return spring 39 being utilized to retain a brake pedal in a rest position. Outward motion of the input piston 23 is limited by flange 43 engaging the housing 13 while outward motion of output piston 15 is limited by the piston engaging stop pin 24 located in housing 13. The bias or return springs 37,39 urge their respective pistons toward the rest or non-actuated positions shown in FIG. 1 with the separation between the pistons (and the rightward motion of piston 15) maintained by connecting rod 41. Linear motion of the input piston 23 within bore 25 is sensed by a travel sensor 29 and the linear motion of the output piston 15 is similarly monitored by travel sensor 31. Fluid leakage from chamber 21 is controlled by conventional seals such as at 47 and 49. The sole fluid connection to the chamber 21 is by way of conduit 51.

A supply of hydraulic fluid resides in the reservoir 53 and is selectively pumped to a pressure fluid accumulator 55 by pump 57. A solenoid actuable valve 59 is normally closed blocking fluid passage from the accumulator to conduit 51. A second solenoid actuable valve 61 that is normally open provides a fluid drain path from chamber 21 by way of conduit 51 to the reservoir 53.

The travel sensors 29 and 31 provide two inputs to an electronic control unit (ECU) 63. The ECU 63 also receives an enabling input on line 65 when the vehicle ignition is enabled and a hydraulic fluid level indicative input on line 67. The ECU 63 provides output signals to selectively enable the solid state switches 71 and 73. A malfunction such as inadequate fluid level may be indicated to the vehicle driver by causing switch 73 to conduct enabling a lamp by way of line 69. When the ECU 63 causes switch 71 to conduct, a circuit is established between vehicle battery voltage on line 75 and vehicle ground enabling the motor 77 to drive fluid pump 57. The ECU 63 also selectively provides solenoid enabling signals to actuate valves 59 and 61 on lines 79 and 81 respectively.

The driver initiates a braking command by moving the input piston 23 toward the left as viewed in FIG. 1, movement of which is sensed by travel sensor 29. The ECU 63 then closes the valve 61 isolating the boost chamber and opens the valve 59 allowing high pressure fluid from accumulator 55 into the chamber 21. This moves the output piston 15, which pushes on a conventional type piston of master cylinder, toward the left until it reaches a predetermined position as monitored by travel sensor 31. Travel of the output piston 15 can be set to exceed that of the input rod thereby providing a ratio change function provides an improving pedal feel to the driver. Pressurized fluid in the boost chamber 21 reacts against the piston face 27 and input rod to provide feedback to the driver as appropriate. When the driver reduces the input force, the input piston 23 correspondingly moves back toward the positon of rest. The ECU 63 also responds by reducing the fluid pressure in boost chamber 21 by alternately opening and closing the valves 59 and 61 to effect a reduction in pressure. Typical types of pulse width modulation (PWM) of these valves can be utilized to control the pressure. In the event of loss of boost by hydraulic or electrical means, manual push through is maintained by a direct link between the input 23, rod 41 and output piston 15. Additionally, independent control of the valves 59 and 61 permit self actuation of the booster thereby enhancing the function of typical advanced modulation functions including ESP and ROM.

Figure 2:
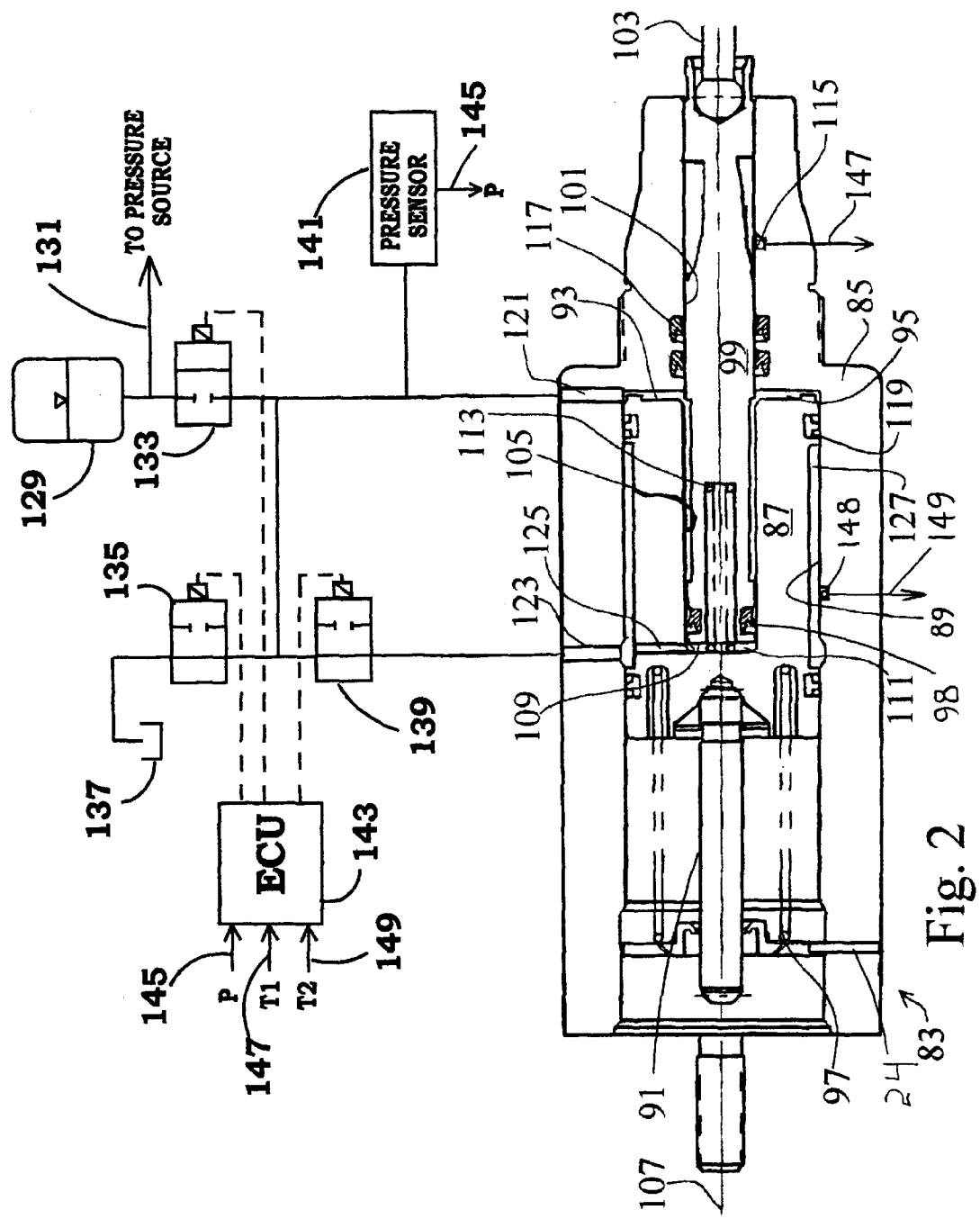
FIG. 2 is a partially cross-sectional, partially schematic view of a brake booster system according to a second embodiment of the invention.

A hydraulic brake booster 83 in cross-section with associated hydraulic and electrical circuitry in block schematic form is shown in FIG. 2 that defines a second brake system according to the invention. The booster 83 includes a housing 85 with a power output piston 87 reciprocally mounted within a generally cylindrical bore 89 within the housing. The output piston 87 is mechanically coupled to a conventional vehicle braking system master cylinder (not shown) by output rod 91. One piston face 93 is exposed to hydraulic fluid pressure presented to a boost chamber 95 within housing 85. The force of hydraulic pressure in chamber 95 acts on the face 93 of output piston 87 and is opposed by a coil biasing spring 97. A driver actuable pedal input piston 99 is also reciprocally mounted within the housing 85 in a second generally cylindrical bore 101. The input piston is mechanically coupled to a conventional driver actuable vehicle brake pedal (not shown) by way of rod 103. The input piston 99 extends through chamber 95 and into a generally cylindrical bore 105 within output piston 87. The cylindrical bores 89, 101 and 105, and the input and output pistons all share a common axis 107. Input piston 99 has a piston face 109 that is exposed to hydraulic fluid pressure within a separate chamber 111 and moves with the output piston 87. The force of hydraulic pressure in chamber 111 acts on input piston face 109 is supplemented or reinforced by return spring 113 that biases a brake pedal toward a rest position and define a reation force. Linear motion of the input piston 99 is sensed by a travel sensor 115. Linear motion of the output piston may be monitored by a travel sensor 98 that function in a similar manner as sensor 31 in FIG. 1. Fluid leakage from chamber 95 is controlled by conventional seals such as 117 mounted within the housing 85 and 119 located on the outer cylindrical surface of output piston 87. There is a fluid connection to the chamber 95 by way of conduit 121 and a separate fluid connection to chamber 111 by way of housing conduit 123 and output piston conduit 125. In addition, chamber 95 is connected to chamber 111 as a lip seal 98 carried by piston 99 provides a one way flow path such that a fluid pressure in chamber 95 is in equilibrium with a fluid pressure in chamber 111. The conduits 123 and 125 are in fluid transmitting communication by way of annular piston groove 127 in all operational positions of the piston 87 within the housing.

Hydraulic fluid is supplied to a pressure fluid accumulator 129 from a fluid source line 131. Line 131 may connect to a dedicated pump as in FIG. 1., to a power steering pump, or any other suitable fluid pressure source. A solenoid actuable valve 133 is normally closed blocking fluid passage from the accumulator. A second solenoid actuable valve 135 is normally open providing a fluid drain path from chamber 95 by way of conduit 121 to sump or other reservoir 137. A third solenoid actuable valve 139 is also normally open providing a drain path from chamber 111 by way of conduits 123 and 125 and the valve 135 to the sump 137. A pressure sensor 141 provides an indication of fluid pressure within chamber 95 and supplies an indication of that chamber pressure to the ECU 143 by way of line 145. The ECU 143 may also receives travel sensor information regarding the input piston from sensor 115 by way of line 147 and, optionally, regarding the output piston from sensor 98 by way of line 149 from a travel sensor 98. The ECU 143 provides output signals to selectively enable the solenoids of valves 133, 135 and 139 as indicated by the dotted lines.

The FIG. 2 embodiment is similar to that of FIG. 1 in that the hydraulically powered brake master cylinder actuating boost piston 87 is reciprocally disposed in the cylindrical bore 105 with the cylindrical bore and a working face 93 of the boost piston defining a boost chamber, but differs somewhat from the FIG. 1 version in that there is a generally cylindrical bore in the boost piston extending from the piston working face 93 part way through the piston for receiving the driver actuable brake input piston 87 which passes through the boost chamber and is reciprocally disposed within the boost piston bore. The boost piston bore, and a working face 109 of the input piston define an input chamber 111. Fluid pressure from the source of pressure fluid on line 131 is selectively supplied to the boost chamber through conduit 121 and to the input chamber by way of conduits 123 and 125. As before, there is a travel sensor 115 for monitoring the motion of the input piston and fluid is selectively supplied to the boost chamber in accordance with the monitored input piston motion. The electronic control unit 143 monitors boost chamber pressure and input piston travel, and controls the normally closed solenoid actuable valve 133 to selectively couple the source 131 and 129 to the boost chamber. A normally open solenoid actuable valve 139 is controlled by the electronic control unit to selectively trap pressured fluid from the normally closed valve 133 to the input chamber 111 and to selectively vent pressure fluid from the input chamber. A pressure sensor determines fluid pressure within the boost chamber as a function of signals from input travel sensors 115,147 and fluid is selectively supplied to the boost chamber in accordance with the determined fluid pressure. The electronic control unit 143 is also operable upon sensing input piston travel unaccompanied by boost chamber pressure change to close the normally open valve 139 trapping a fixed volume of fluid in the input chamber 111, whereby the ratio of output piston travel to input piston travel is fixed at 1:1. A pressure fluid conduit 121 in the housing couples the source of pressure fluid to the boost chamber 95 when the normally closed valve 133 opens, and a fluid path including the normally closed valve 133, when open, the normally open valve 139, a housing aperture 123, an output piston aperture 125, and an annular space 127 intermediate the housing bore and output piston which couples the housing aperture and output piston aperture regardless of output piston position cooperate to supply pressure fluid from the source to the input chamber. The conduit 121 provides the only path for fluid entering or exiting the boost chamber. In the event of boost system failure, valves 135 and 139 revert to the normally open position, input piston 99 is allowed to engage the end of bore 105 and brake pressure reverts to unassisted manual operation. A feature of this embodiment resides in an ability for the ECU 145 to also evaluate the movement of piston 87 through either the travel sensor 116 or the pressure sensor 141 as a function of the movement of piston 99 as measured by travel sensor 115 is effecting a desired brake application.

In an event that the ECU 143 determines that the fulid pressure supplied to chamber 95 does not correspond to a desired braking application as derived from the travel sensed by travel sensors 115 and the travel of power piston 87 as derived from the travel sensed by travel sensor 98 or the pressure sensed by sensor 145, a signal is sent to close solenoid valve 139 and trap fluid in chamber 111. Thereafter, the input force applied to rod 103 moves input piston 99 into engagement with power piston 87 to provides a 1:1 manual force that supplements the output force derived from the pressuried fluid supplied to chamber 95. On termination of the input force to rod 103, the return springs 113 and 97 move the input piston 99 and poer popoun ibabemnnvalve balsignal derived from sensor piston 97 to the rest positon as valves 139 and 135 are opened to the reservoir 137.

We claim:

1. A vehicle brake booster (11,83) comprising:
    a source of pressure fluid (55,129);
    a booster housing (13,85) having first (25,101) and second (17,89) generally cylindrical bores therein;
    a driver actuable brake input piston (23,99) reciprocally disposed in said first cylindrical bore (25,101);
    a hydraulically powered brake master cylinder actuating output piston (15,87) reciprocally disposed in said second cylindrical bore (17,89), said second cylindrical bore (17,89) and output piston (15,87) defining a boost chamber (21,95) with the input piston (23,99) extending from the second bore (17,89) into the boost chamber (21,95);
    a pressure fluid conduit (51,121) for coupling the source of pressure fluid (55,129) to the boost chamber (21,95), the boost chamber (21,95) being completely defined by the second cylindrical bore (17,89), the input piston (21,99), the output piston (15,87) and the fluid conduit (51,121).

2. The brake booster (11,83) of claim 1, further comprising an input piston travel sensor (29,115) for monitoring vehicle driver induced motion to said input piston (23,99).

3. The brake booster (11,83) of claim 2, further comprising a normally closed solenoid actuable valve (59,133) intermediate the source (55,129) and the fluid conduit (51,121) for controlling the supply of pressure fluid by way of the conduit (51,121) to the boost chamber (21,95).

4. The brake booster (11,83) of claim 3, further comprising an electronic control unit (63,143) responsive to motion indications from the travel sensor (29,115) for selectively enabling the solenoid actuable valve (59,133) to supply pressure fluid to the boost chamber (21,121).

5. The brake booster (11,83) of claim 4, further comprising a normally open solenoid actuable valve (61,135) coupled to the fluid conduit (51,121) for selectively releasing pressure fluid from the boost chamber (21,95).

6. The brake booster (11,83) of claim 1, wherein the source of pressure fluid comprises a dedicated fluid pump (57), pump driving motor (77), and pressure fluid accumulator (55,129), the motor (77) being selectively enabled by the electronic control unit (63,143).

7. The brake booster (11,83) of claim 4, further comprising an output piston travel sensor (31,148) for supplying output piston position indications to said electronic control unit (63,143), said electronic control unit (63,143) controlling communication of a normally closed solenoid (59,133) to supply pressure fluid to the boost chamber (21,95) that moves said output piston (15,87) to a position corresponding to said driver induced motion to said input piston (23,99).

8. The brake booster (11,83) of claim 7, wherein the electronic control unit (63,143) sets a determinable ratio of motion of the output piston (15,87) to motion of the input piston (23,99).

9. The brake booster (11) of claim 1, wherein the conduit (51) provides the only path for fluid entering or exiting the boost chamber (21).

10. The brake booster (11,83) of claim 1, wherein the input (23,99) and output (15,87) pistons include working faces (27,19,109,93) responsive to fluid pressure within the boost chamber (21,95), the area of the output piston working face (19,93) substantially exceeding the area of the input piston working face (27,109).

11. A vehicle brake booster (83) comprising:
    a housing (85) having a generally cylindrical bore (89);
    a hydraulically powered brake master cylinder actuating boost piston (87) reciprocally disposed in the cylindrical bore (89), the cylindrical bore (89) and a working face (93) of the boost piston (87) defining a boost chamber (95);
    a generally cylindrical bore (105) in the boost piston (87) extending from the piston working face (93) part way through the piston (87);

a driver actuable brake input piston (99) passing through the boost chamber (121) and reciprocally disposed within the boost piston bore (105), said boost piston bore (105) and a working face 109) of the input piston (99) defining an input chamber (111);

a source of pressure fluid (129); and means (143,139,133,129) for selectively supplying fluid pressure from the source (129) to the boost chamber (95) and to the input chamber (111).

12. The brake booster of claim 11, further comprising a first travel sensor (115) for monitoring the motion of the input piston (99) and the means (143,139,133,129) for selectively supplying fluid supplying fluid to said boost chamber (95) functions in accordance with the monitored input piston (99) motion.

13. The brake booster of claim 11, wherein the means (143,139,133,129) for supplying includes an electronic control unit (143) for monitoring boost chamber (95) pressure and input piston (99) travel, and a normally closed solenoid actuable valve (133) controlled by the electronic control unit (143) and selectively coupling the source (129) to the boost chamber (95) for controlling the supply of pressure fluid from the source to the boost chamber (95).

14. The brake booster of claim 13, further comprising a normally open solenoid actuable valve (135) controlled by the electronic control unit (143) for selectively supplying pressure fluid from the normally closed valve (133) to the input chamber (111) and for selectively venting pressure fluid from the input chamber (111).

15. The brake booster of claim 11, further comprising a pressure sensor (141) for determining fluid pressure within the boost chamber (95) and the means (143,139,133,129) for selectively supplying fluid supplying fluid to the boost chamber functions in accordance with the determined fluid pressure.

16. The brake booster of claim 15, wherein the means for supplying (143,139,133,129) includes an electronic control unit (143) for monitoring boost chamber pressure (95) and input piston travel (99), and the electronic control unit (163) operable upon sensing input piston travel (115) unaccompanied by boost chamber (95) pressure change, to close the normally open valve (135) trapping a fixed volume of fluid in the input chamber (95), whereby the ratio of output piston (87) travel to input piston (99) travel is fixed at 1:1.

17. The brake booster of claim 16, further comprises seal means (98) whereby fluid in said boost chamber (95) is communicated from said boost chamber (95) to the input chamber (111) to provide a balance there between.

18. The brake booster of claim 11, further comprising a pressure fluid conduit (121) in the housing (85) for coupling the source (143,139,133,129) of pressure fluid to the boost chamber (95) when the normally closed valve opens (133), and a fluid path including the normally closed valve (133) when open, the normally open valve (135), a housing aperture (123), an output piston aperture (125), and an annular space (127) intermediate the housing bore (89) and output piston (87) coupling the housing aperture (123) and output piston aperture (125) regardless of output piston (877) position to supply pressure fluid from the source to the input chamber (111).

19. The brake booster of claim 17, wherein said conduit (121) provides the only path for fluid entering or exiting the boost chamber (95).

20. The brake booster of claim 12, further comprising a pressure sensor (145) for determining fluid pressure within the boost chamber (95), a second travel sensor (148) for monitoring the motion of said boost piston (87), the means (143,139,133,129) for selectively supplying fluid supplying fluid to the boost chamber (95) in accordance with the determined fluid pressure and confirmed by an input from said second travel sensor (148).

* * * * *